United States Patent [19]
Wallin et al.

[11] 3,822,439
[45] July 9, 1974

[54] ROLLER NUT-TYPE CONTROL ROD DRIVE

[75] Inventors: Robert A. Wallin, Lynchburg, Va.; John R. Null, Canal Winchester; Don W. Smith, Lancaster, both of Ohio

[73] Assignee: Diamond Power Specialty Corporation, Lancaster, Ohio

[22] Filed: Feb. 22, 1973

[21] Appl. No.: 334,851

[52] U.S. Cl. .......................... 74/424.8 R, 176/36 R
[51] Int. Cl. ............................ F16h 1/18, G21c 7/08
[58] Field of Search .............. 176/36 R; 310/67, 83; 74/424.8 R

[56] References Cited
UNITED STATES PATENTS

| | | | |
|---|---|---|---|
| 3,053,104 | 9/1962 | Scavini | 74/424.8 R |
| 3,079,323 | 2/1963 | Hawke | 74/424.8 R |

*Primary Examiner*—Leonard H. Gerin
*Attorney, Agent, or Firm*—Harness, Dickey & Pierce

[57] ABSTRACT

A control rod drive of the type wherein the load is actuated by a non-rotatable screwshaft driven axially within a sealed tubular enclosure includes a spinning nut assembly consisting of roller nuts mounted on pivoted segment arms and movable into and out of mesh with the screwshaft by energization and deenergization of an induction-type motor. The segment arms form a portion of the rotor so that when the field of stator rotates the roller nuts planetate to drive the shaft. A combined support and convection-controlling housing structure for the mechanism is adapted to be attached to the cover of a reactor vessel and includes an upwardly extending torque-taking piston-carrying section connected to the screwshaft and a snubbing cylinder for controlling the rate of descent and absorbing shock in event of scan, and means for parking the screwshaft in a raised position.

16 Claims, 10 Drawing Figures

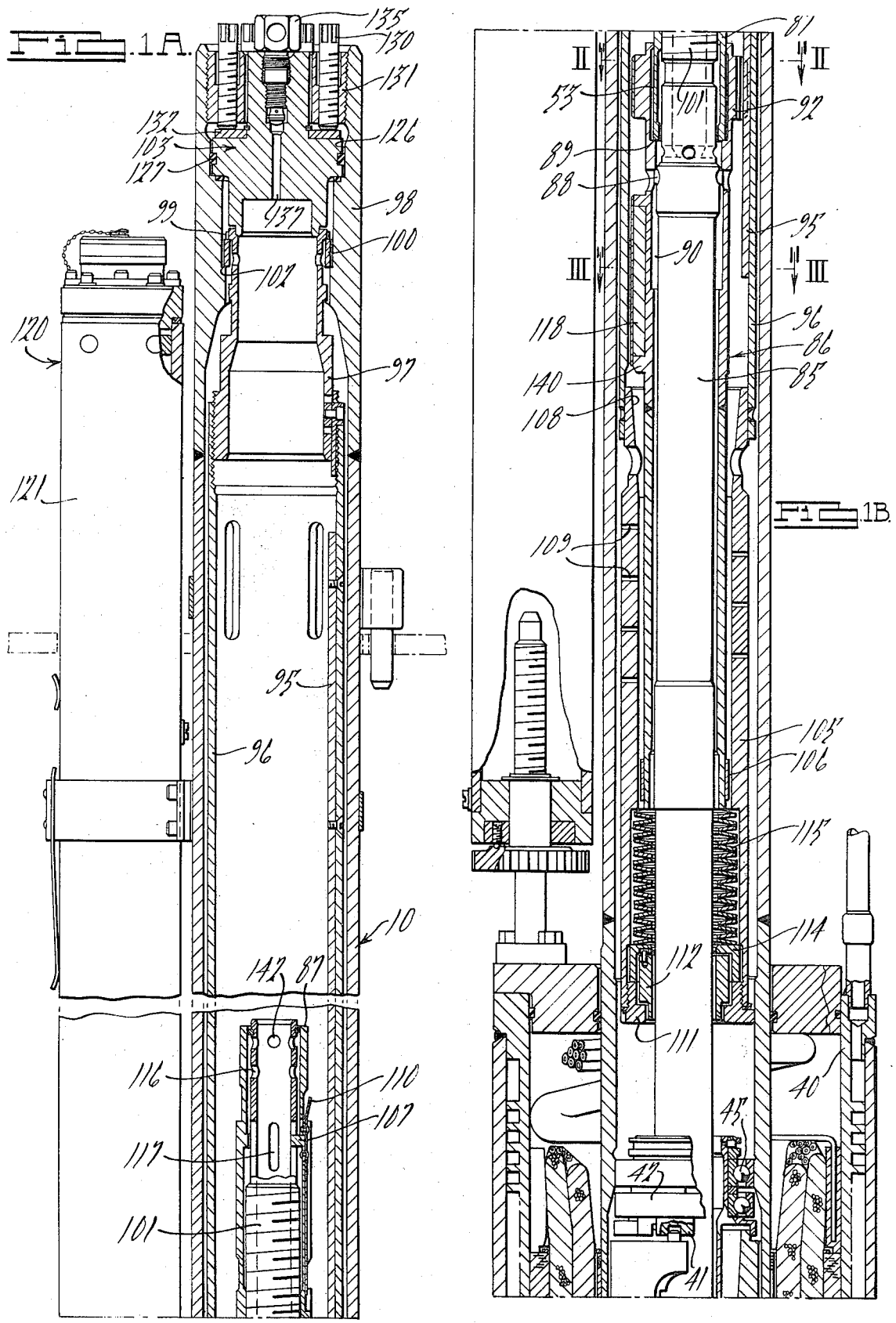

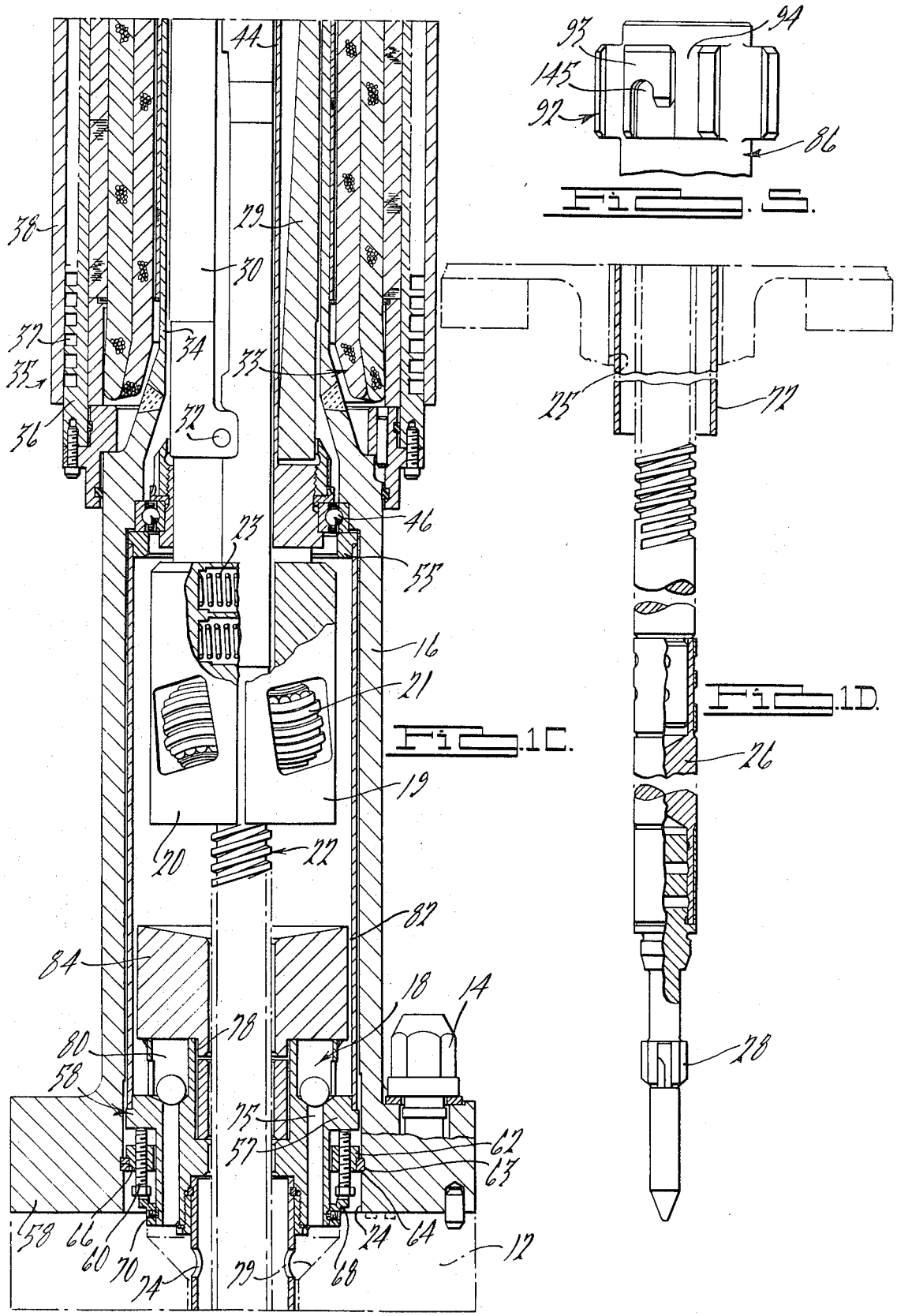

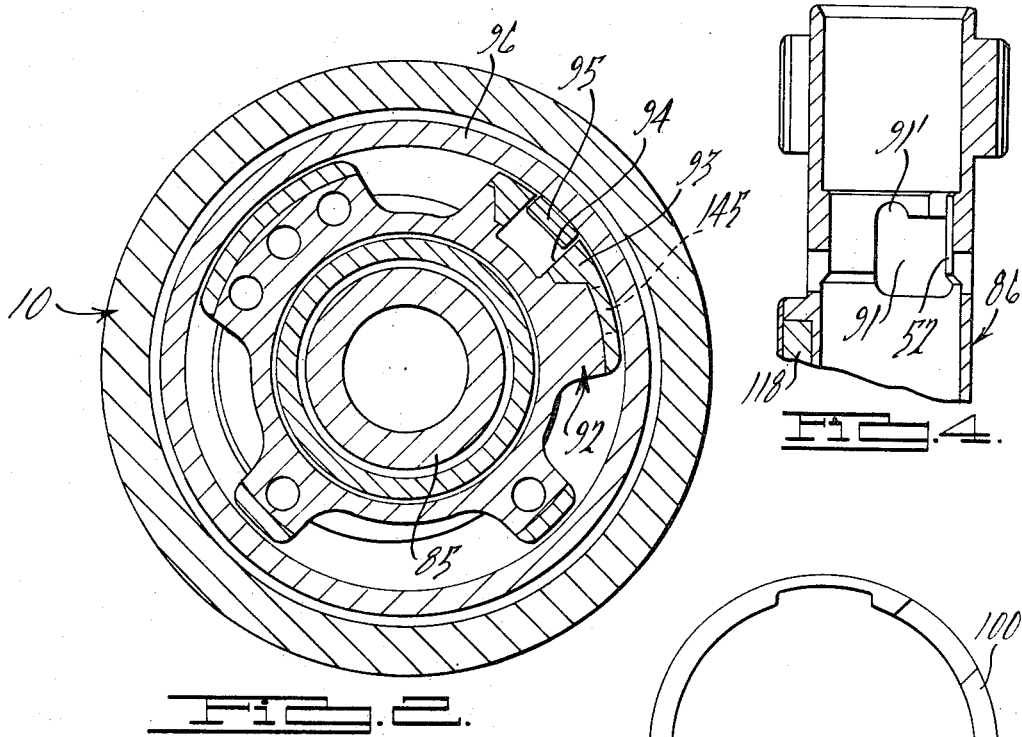
FIG.2.
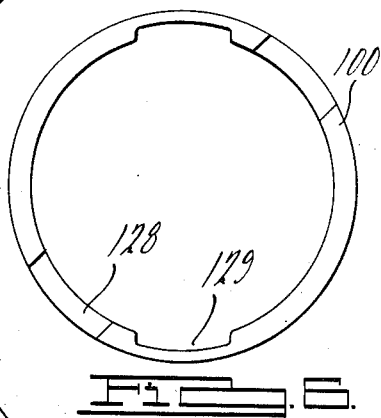
FIG.4.
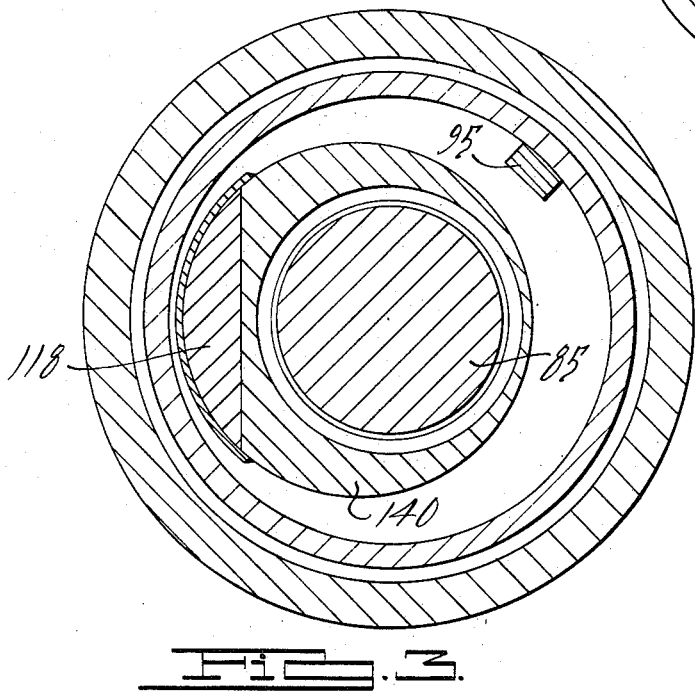
FIG.3.
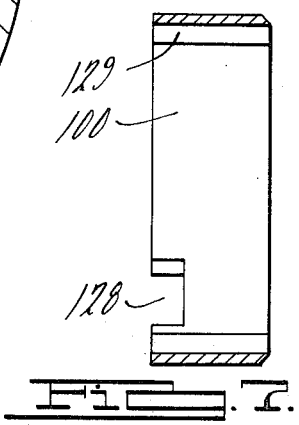
FIG.6.
FIG.7.

ROLLER NUT-TYPE CONTROL ROD DRIVE

BACKGROUND OF THE INVENTION

Control rod drives of the general class to which this invention is directed are disclosed in U.S. Pat. Nos. 2,780,740 granted Feb. 5, 1957, 2,812,455 granted Nov. 5, 1957 and 2,857,537 granted Oct. 21, 1958. The overall objective of the present invention is to improve upon the control rod drives disclosed in the patents referred to, and to eliminate difficulty which sometimes occurs due to unwanted convection-induced circulation of heated water between the reactor vessel and the control rod drive housing, to protect the drive components from the harmful effects of the more highly heated water contained in the reactor vessel, to provide for quick and simple access to the internal parts in event servicing is necessary, thereby minimizing time exposure of personnel to radiation, and to improve and simplify the operation of the drive and the ease of servicing of the control rods of the reactor.

Other objects and advantages will become apparent upon consideration of the present disclosure in its entirety.

BRIEF DESCRIPTION OF THE FIGURES OF DRAWING

FIGS. 1A, 1B, 1C and 1D are diametric longitudinal sectional views, with some components shown in elevation, and some components broken away, these views being adapted to be arranged in axially aligned abutting relation with views 1B, 1C and 1D progressively and successively arranged toward the right, to afford a complete view of a preferred embodiment of the invention;

FIGS. 2 and 3 are cross sectional views taken substantially on the lines II—II and III—III respectively of FIGS. 1B and looking in the direction of the arrows;

FIG. 4 is a diametric section of the upper portion of the torque-taker assembly, taken substantially as indicated by the line IV—IV in FIG. 2;

FIG. 5 is a fragmentary side elevation view of the upper portion of the torque-taker assembly;

FIG. 6 is a plan view of the torque tube support ring; and

FIG. 7 is a diametric section of the torque tube support ring.

DETAILED DESCRIPTION OF PREFERRED FORM OF THE INVENTION

Reference character 10 designates generally a tubular housing structure formed of a plurality of aligned sections welded together in sealed relation and adapted to be secured in upstanding position to the cover of a reactor vessel of a water-containing reactor, to a nozzle flange as 12 of which the housing is attachable by means of lag screws 14 projected through the bottom flange 15 of the housing. The lower section of the housing contains a convection inhibiting or thermal barrier assembly generally designated 18 and a pair of lever arms 19, 20, each of which carries a roller nut as 21, swingable, with the lever arms, into and out of meshing engagement with the axial screwshaft or lead screw 22. The lead screw extends downwardly through aligned openings 24, 25, in the flange 15 and nozzle 12, carrying at its lower extremity an extension portion 26 having a suitable coupling part 28 for the removable attachment of a control rod (not shown).

The arms 19, 20 which carry the roller nuts are integral with arms 29, 30 respectively, which extend upwardly therefrom within the motor section 34 of the housing assembly, and together with arms 19, 20 define levers of the first class pivoted on pins 32 mounted in a rotor carrier body 44. The arms 29, 30 form segments of the rotor of an induction motor assembly, as is well known in the art, so that when the stator windings are energized sequentially by a polyphase current, the rollers are held in engagement with the leadscrew, and planetate to drive the non-rotating screw and the load. As is also well known, the shaft may be supported by the rollers in a fixed position by maintaining a non-rotating field current in the stator windings, while if the field collapses, the rollers are unmeshed by the biasing springs 23, and the leadscrew and load drop. The stator of the motor is generally designated 33 and is located outside the housing assembly 10. The motor section 34 of the housing assembly, which is surrounded by the stator, is formed of a material such as magnetic stainless steel or clad and plated carbon steel.

A jacket 35 for cooling water surrounds the stator and consists of a metal sleeve 36 having a helical peripheral water channel in its outer surface, the convolutions of the water channel being closed by a sleeve 38. Cooling water is fed into and through the channels and discharged therefrom via suitable fittings as 40.

The radial movements of the segment arms 29, 30 are synchronized by a synchronizing ring 41 and bearing 42, the arrangement of such parts being similar to that disclosed in the aforementioned U.S. Pat. No. 2,812,455. The rotor body 44 is journaled in upper and lower antifriction bearings 45, 46. The lower bearing 46 is retained by means of a thrust sleeve 48 which reacts upwardly against a thrust ring 50 which in turn retains the outer race of the bearing 46. At its lower end the thrust sleeve 48 is retained by a shoulder 56 formed on a flange 57 of a member 58 which forms the main body of the thermal barrier assembly 18 as well as a support for the rotor and drive components.

The member 58 is retained in the open lower end of the housing by means of a plurality of jacking screws 60 threaded in a retaining ring 62 which is in turn retained by ring assembly 63 formed in three radially split segments and trapped above a shoulder 64 in the internal wall 24 of bottom flange portion 15 of the housing structure. The jacking screws 60 bear upwardly against the bottom of the flange 57 of member 58. The retaining ring 62 is provided with a reduced portion 66 which projects into the sectional ring assembly 63, thereby defining a shoulder (undesignated) which overlies the ring assembly. The spacing between the retainer ring 62 and the flange 57 is sufficient so that when the jacking screws 60 are loosened, the ring 62 may be moved upwardly to free the sections of ring 63 for removal, thereby freeing all of the retained parts. When assembled as shown and the screws are tightened fully to retain the parts in place, the jacking screws are locked by a locking ring 68 secured to the lower end of the body member 58. The locking ring has upwardly opening slots (undesignated) proportioned to embrace the sides of the hexagonal heads of the jacking screws to lock them against accidental loosening. When the retaining set screws 70 for the locking ring 68 are removed, it will be seen that the body member 58 and all the parts retained by it, including the thermal barrier components and the internal motor parts, may be removed through the bottom opening 24 of the housing structure.

A tubular support 72 is also threadedly supported at its upper end in the body 58 and extends downwardly around the screwshaft into the reactor vessel through the opening 25 in the nozzle, the support 72 being radially spaced from the interior of the nozzle, as well as from the screwshaft.

Water flows upwardly and downwardly between the reactor vessel and the interior of the housing when the control rod is actuated, passing radially through holes 74 formed in the upper portion of the support 72 which provide connection between the reactor vessel and the space within the housing 10. Holes 74 open into a countersunk enlargement 79 in nozzle flange 12 below the body 58. The body 58 contains a plurality of vertical passages 75 each of which communicates at its lower end with the space within the counterbore 79 and each of which has at its upper extremity a seat portion 76 for a valve ball 77 trapped above the seat in a cage portion 78. Cage portion 78 has radial openings 80 in its peripheral wall permitting the water to flow to and from the passages 75 via the peripheral space 82 around the flange portion 84 of the body 58. A heavy closure flange 84 overlies the cage portions and is welded to the body 58.

A cylindrical upper extension portion 85 attached to the leadscrew is provided near its upper end with a vertically adjustable connection to a tubular torque-taking assembly 86 spacedly surrounding the extension 85 and which is keyed against rotation with relation to, but slidable in the housing 10. The extension 85, and thereby the leadscrew are in turn keyed against rotation by a cross pin 88 which projects radially through and from extension 85 and which during normal operation extends into slots 51 formed in the inner wall of the torque-taker assembly 86 to key the leadscrew assembly against rotation with relation to the torque-taker assembly. Near its upper end the torque-taker assembly 86 carries a guide spider 92 having a plurality of bearing pads for engagement with the inner wall of the torque tube portion 104 of a torque tube and snubber cylinder assembly 96. One of the bearing pads of the guide spider has an axially extending keying groove 94 in its outer surface slidably overfitted upon a longitudinally extending key 95 secured to the inner wall of the torque tube portion 104 which is in turn held against rotation with relation to the housing.

A height adjustment for the dropped or full-down position of the leadscrew (and of the load), and a release to permit rotation of the leadscrew, is provided as a part of the connecting means between the upper leadscrew extension 85 and the torque-taker assembly 86. External threads 101 are provided on leadscrew extension 85 near but spacedly below its top, meshing with internal threads (undesignated) in a tubular nut 87 seated on a shoulder 89 in the torque-taker assembly. A dog 107 carried by the nut is mounted on a leaf spring 110 which releasably urges it into engagement with selectively arranged hole and slot portions 116, 117 in the leadscrew extension, permitting the nut to be locked to hold the leadscrew at different desired elevations. When the dog is withdrawn the leadscrew is movable up and down, by rotating the nut.

The leadscrew can be lowered, by means of the nut 87, to a position such that the crosspin 88 moves out of slots 51 and into an internal enlargement 90 in the torque-taker which permits the leadscrew to rotate for coupling and uncoupling the load. The keying slots 51, which are formed in an internally thickened wall portion above the enlargement 90, do not extend all the way to the top of such thickened wall portion, but each communicates with one of a pair of widened and upwardly notched relieved areas 91 which permit limited relative rotation of the leadscrew and torque-taker assembly except when the pin is in the upwardly notched sections 91'. When the pin is in the wider relieved areas 91 below the notched sections, the leadscrew can be turned sufficiently to aligned the projecting ends of the crosspin with another pair of slots designed 52, which extend for the full vertical height of the thickened area and communicate with the counterbored enlargement 53 at the upper end of the torque-taker assembly which accommodates the nut 87 and which enlargement permits the extension and rod to be pulled up and entirely out of the drive assembly when the closure parts are removed.

The torque tube and snubber cylinder assembly 96 is attached at its upper end to the housing 10 and extends downwardly therewith around the screwshaft and torque-taker sleeve 86. The torque tube and snubber cylinder assembly 96 is radially spaced inwardly from the inner wall of the housing and is also spaced radially outwardly of the torque-taker tube 86. At its upper end the torque tube portion of assembly 96 is threadedly secured to a reduced top hanger section 97 which is in turn displaceably supported in the top section 98 of the housing assembly 10 by means of a plurality of vertical ribs 99 on the periphery of top section 97 and which overlie and rest in partial depth slots 128 in a ring 100 seated on a shoulder 102 formed in the inner wall of housing section 98. The ring 100 also contains full depth slots 129 extending its full axial length, and positioned so that when it is desired to lower the leadscrew for coupling or uncoupling, the assembly 96 can be raised to free the ribs from the part depth slots, the ring 100 turned to align the full depth slots with the ribs, and then assembly 96 lowered. A closure member 103 fitted in the housing section 98 seals the upper end of the housing and retains the parts.

The snubber cylinder portion 105 of the assembly 96 is of reduced internal diameter and proportion to receive a piston 106 carried by the lower end of the torque-taker assembly 86. The upper end of the cylinder defined by section 105 is slightly flared, as indicated at 108, to guide the piston into the cylinder when the rod descends, and the cylinder wall is provided with a series of ports 109 which are progressively closed off by the piston as it approaches the lower imperforate end of the cylinder. The lower end of the cylinder is substantially closed by a bushing assembly including a retaining bottom member 111 threaded into the lower end of the cylinder and having a peripheral spider flange to locate the torque tube assembly in the housing 10 while permitting fluid to flow past the same. Member 111 supports via interposed bushing members 112, 114 a stacked Belleville washer type buffer spring assembly 115 which is thereby trapped in the bottom of the cylinders to receive and absorb the impact of the torque-taker sleeve and load when the latter descends rapidly during scram.

A portion of the side wall of the torque-taker assembly which remains above the cylinder 105 when the torque-taker is all the way down carries a permanent magnet 118 positioned as close as possible to the wall of the housing assembly and which actuates position sensing means (not shown) located in position indicator housing 120 secured to the side of the main housing assembly 10 and extending longitudinally thereof. Housing 120 contains magnetically actuatable switching means suitably electrically connected to remote indicating means (not shown) to designate at a remote location the position occupied by the magnet, and therefore of the control rod. The housing 120 of the position indicator is preferably formed of a non-metallic material such as glass-fiber-reinforced plastic. The magnet-sensing components within the housing tube 120 are mounted on a plastic panel inside the housing. Since the tube and the panel are formed of materials having similar coefficients of expansion, the accuracy of the position indicator is substantially unaffected by temperature changes.

The top closure 103 is formed with a peripheral flange 125 containing a suitable sealing ring 127, the flange and sealing ring being fitted in a smooth internal wall 126 in the upper section 98 of the housing assembly. The closure 103 is retained in a counterbore defining the wall 126 by means of a plurality of jacking screws 130 threaded into, through and beyond a threadedly-installed top abutment 131 and when tightened bearing against a thrust washer 132 on top of flange 125. Closure 103 also contains a suitable high pressure relief valve contained in an axial screw 135 and which communicates with a passage 137 extending through the closure from the interior of the housing. The details of the high pressure relief valve form no part of the present invention.

The magnet 118 is housed in an enlargement 140 of the torque-taker sleeve 86, which enlargement is defined by an eccentric portion projecting toward the side of the housing which carries the position indicator assembly 120. As brought out in FIG. 3 this arrangement positions the magnet close to the outer wall, while leaving a substantial passage area for fluid flow past the magnet. Substantial passage areas are also provided between the other components so that the flow of liquid is substantially unimpeded except, of course, in the desired areas comprising the thermal barrier assembly and within the snubber cylinder 105.

The tubular upper extremity of the leadscrew extension 85 is provided with holes 142 for connecting a grappling and lifting tool thereto when the closure 103 is removed. The leadscrew and connected parts are thus also readily manipulable. The torque-taker and leadscrew may be pulled upwardly and held in a raised position to facilitate servicing of the reactor such as is required during refueling, without requiring the lifting means to be kept connected and thus tied up during the parked period. The pad 93 of the guide spider 92 at the upper end of the torque-taker is provided with a J-slot 145 on its outer surface intersecting the keyway 94 and so arranged that when the torque-taker and leadscrew are pulled up to a position where pad 93 is entirely above the key 95, and the assembly consisting of the leadscrew and torque-taker is rotated, the J-slotted part of pad 93 then overlies the top of the key 95 and the torque-taker and leadscrew are thereby held in the raised position independently of the lifting apparatus. Replacing the top closure locks the leadscrew in the parked position.

This Detailed Description of Preferred Form of the Invention, and the accompanying drawings, have been furnished in compliance with the statutory requirement to set forth the best mode contemplated by the inventors of carrying out the invention. The prior portions consisting of the "Abstract of the Disclosure" and the "Background of the Invention" are furnished without prejudice to comply with administrative requirements of the Patent Office.

We claim:

1. In a control rod drive of the type wherein a non-rotatable screwshaft is driven axially within a tubular housing by a spinning nut structure within and spaced from one end of the housing, the housing having a coupling portion at said end for coupling the same to a supporting nozzle, the coupling portion and nozzle having mating openings through which the screwshaft travels, and means for positioning the spinning nut structure within the housing including a thrust bearing for the nut structure, a thrust bearing support located spacedly around the screwshaft within the housing and extending longitudinally between the thrust bearing and the coupling portion, improved means for removably positioning and retaining the thrust bearing support including a plurality of jacking screws against said support and against said coupling portion and peripherally spaced around the screwshaft within the housing and accessible through the opening in the coupling portion when the same is separated from the nozzle.

2. In a control rod drive as defined in claim 1, means carried by said coupling portion for controlling circulation of liquid through said openings.

3. In a control rod drive as defined in claim 1, means including a check valve carried by said coupling portion for controlling circulation of liquid through said openings.

4. In a control rod drive as defined in claim 1, means including a plurality of ball-type check valves peripherally spaced around the screwshaft and carried by said coupling portion for controlling circulation of liquid through said openings.

5. In a control rod drive of the type wherein a screwshaft is driven by a spinning nut and which includes a tubular housing having an end portion with an opening therein and adapted to be coupled in fluid-tight relation to a mating opening in a reactor vessel of the type which contains liquid, whereby liquid may circulate between the vessel and the interior of the housing, and including motor means carried by the housing at a position spaced from said end portion for driving the nut to actuate the screwshaft translatably within the housing and through said openings to actuate a control rod in the vessel, the improvement which comprises means for controlling circulation of liquid into and from the housing including check valve means opening toward the interior of the housing and biased to closed position with a force sufficient to prevent opening thereof under the convection-inducing influence of temperature/density differences between liquid in the housing and in the vessel.

6. A control rod drive as defined in claim 5, wherein the check valve means is located at a position between said end of the housing and the motor means.

7. A control rod drive as defined in claim 5, arranged for vertical installation and wherein the screwshaft extends axially within the casing, said check valve means comprising a plurality of relatively massive upwardly-opening ball-type check valves arranged around the screwshaft.

8. A control rod drive as defined in claim 5, arranged for vertical installation and wherein the screwshaft extends axially within the casing, a coupling at said end of the housing for attaching the same to a nozzle on a reactor vessel cover, said check valve means being mounted in said coupling.

9. A control rod drive as defined in claim 5, arranged for vertical installation and wherein the screwshaft extends axially within the casing, a coupling at said end of the housing for attaching the same to a nozzle on a reactor vessel cover, said check valve means being mounted in said coupling and comprising a plurality of relatively massive upwardly-opening ball-type check valves arranged around the screwshaft.

10. In a control rod drive of the type having a tubular housing, a vertical driving shaft, means for driving the shaft axially, the driving means being releasable to permit gravity drop of the shaft, a tubular snubber cylinder fixed in and radially spaced from the inner wall of the housing and spacedly surrounding the shaft, a tubular torque transmitting member surrounding and movable with the shaft and interposed between the shaft and the snubber cylinder and slidably keyed to the latter, and a piston portion carried by the torque transmitting member for coacting with the cylinder.

11. A drive as defined in claim 10 wherein said cylinder has a supporting extension portion carrying keying means to which the torque transmitting member is slidably keyed, and means releasably securing the shaft and torque transmitting member against relative rotation.

12. A drive as defined in claim 10 wherein said cylinder has a supporting extension portion carrying keying means to which the torque transmitting member is slidably keyed.

13. A drive as defined in claim 12 including nut means for holding the shaft and torque transmitting member against relative axial movement at different relative heights.

14. A drive as defined in claim 11 including nut means for holding the shaft and torque transmitting member against relative axial movement at different relative heights.

15. A drive as defined in claim 11 wherein said last-named means includes an axial keying portion having a peripheral extension permitting angular movement of the leadscrew in one of its positions relative to the torque transmitting member.

16. In a control rod drive of the orbital nut type having a tubular housing, a vertical screwshaft for driving a load, means for preventing unwanted rotation of the screwshaft, orbital sectional nut means for driving the screwshaft axially, means for moving the sections of the nut means apart to release and permit gravity drop of the screwshaft, said means for preventing unwanted rotation of the screwshaft including a tubular snubber cylinder fixed in and radially spaced from the inner wall of the housing and spacedly surrounding the screwshaft, a tubular torque transmitting member surrounding and movable with the screwshaft and interposed between the screwshaft and the snubber cylinder and slidably keyed to the latter, and a piston portion carried by the torque transmitting member for coacting with the cylinder.

* * * * *

UNITED STATES PATENT OFFICE
CERTIFICATE OF CORRECTION

Patent No. 3,822,439          Dated July 9, 1974

Inventor(s) Robert A. Wallin, John R. Null and Don W. Smith

It is certified that error appears in the above-identified patent and that said Letters Patent are hereby corrected as shown below:

In the Abstract, second from last line, "scan" should be --scram--.
Column 1, line 59, after "section" insert -16--.
Column 4, line 15, "aligned" should be --align--.
Column 4, line 16, "designed" should be --designated--.
Column 4, line 26, "therewith" should be --therewithin--.
Claim 1, line 27, after "screws" insert --reacting--.

Signed and sealed this 29th day of October 1974.

(SEAL)
Attest:

McCOY M. GIBSON JR.
Attesting Officer

C. MARSHALL DANN
Commissioner of Patents